US012027813B2

(12) United States Patent
Takeshita et al.

(10) Patent No.: US 12,027,813 B2
(45) Date of Patent: Jul. 2, 2024

(54) OPTICAL AMPLIFIER AND OPTICAL AMPLIFICATION METHOD

(71) Applicant: NEC Corporation, Tokyo (JP)

(72) Inventors: Hitoshi Takeshita, Tokyo (JP); Keiichi Matsumoto, Tokyo (JP); Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 770 days.

(21) Appl. No.: 17/044,088

(22) PCT Filed: Apr. 8, 2019

(86) PCT No.: PCT/JP2019/015315
§ 371 (c)(1),
(2) Date: Sep. 30, 2020

(87) PCT Pub. No.: WO2019/198663
PCT Pub. Date: Oct. 17, 2019

(65) Prior Publication Data
US 2021/0057869 A1  Feb. 25, 2021

(30) Foreign Application Priority Data
Apr. 11, 2018 (JP) ................. 2018-076208

(51) Int. Cl.
H01S 3/094 (2006.01)
H01S 3/067 (2006.01)
(Continued)

(52) U.S. Cl.
CPC .... H01S 3/094015 (2013.01); H01S 3/06716 (2013.01); H01S 3/06733 (2013.01);
(Continued)

(58) Field of Classification Search
None
See application file for complete search history.

(56) References Cited

U.S. PATENT DOCUMENTS 6,333,810 B1  12/2001  Yoon et al.
2002/0008901 A1 * 1/2002  Kinoshita ............... H01S 3/302
                                                         359/341.1
(Continued)

FOREIGN PATENT DOCUMENTS

JP  H01-95580 A   4/1989
JP  H04-128719 A  4/1992
(Continued)

OTHER PUBLICATIONS

International Search Report dated Jun. 25, 2019, in corresponding PCT International Application.
(Continued)

Primary Examiner — Eric L Bolda

(57) ABSTRACT

In optical amplifiers that use a multicore optical fiber, the absorption efficiency of excitation light in an optical amplification medium is low and the amplification efficiency of light intensity becomes lower in the cladding excitation method; therefore, an optical amplification apparatus according to the present invention includes an optical amplification medium, having a gain in a wavelength band of signal light, configured to receive the signal light; excitation light introduction means for introducing, into the optical amplification medium, excitation light to excite the optical amplification medium; and residual excitation light introduction means for introducing, into the optical amplification medium, residual excitation light output from the optical amplification medium, the residual excitation light having a wavelength component of the excitation light.

16 Claims, 9 Drawing Sheets

(51) Int. Cl.
*H01S 3/10* (2006.01)
*H01S 3/16* (2006.01)

(52) U.S. Cl.
CPC ...... *H01S 3/06737* (2013.01); *H01S 3/06754* (2013.01); *H01S 3/094007* (2013.01); *H01S 3/094053* (2013.01); *H01S 3/1001* (2019.08); *H01S 3/1608* (2013.01)

(56) References Cited

U.S. PATENT DOCUMENTS

2004/0196537 A1* 10/2004 Starodoumov ... H01S 3/094003
359/341.3
2020/0301066 A1* 9/2020 Takasaka ............. G02B 6/4296

FOREIGN PATENT DOCUMENTS

| | | |
|---|---|---|
| JP | H06-164021 A | 6/1994 |
| JP | H09-160085 A | 6/1997 |
| JP | 2000-261078 A | 9/2000 |
| JP | 2001-085768 A | 3/2001 |
| JP | 2005-019501 A | 1/2005 |
| JP | 2011-066142 A | 3/2011 |
| JP | 2013-236115 A | 11/2013 |
| JP | 2016-127241 A | 7/2016 |
| JP | 2017-005083 A | 1/2017 |
| JP | 2017-183564 A | 10/2017 |

OTHER PUBLICATIONS

Japanese Office Communication for JP Application No. 2020-513253 dated Feb. 1, 2022 with English Translation.

* cited by examiner

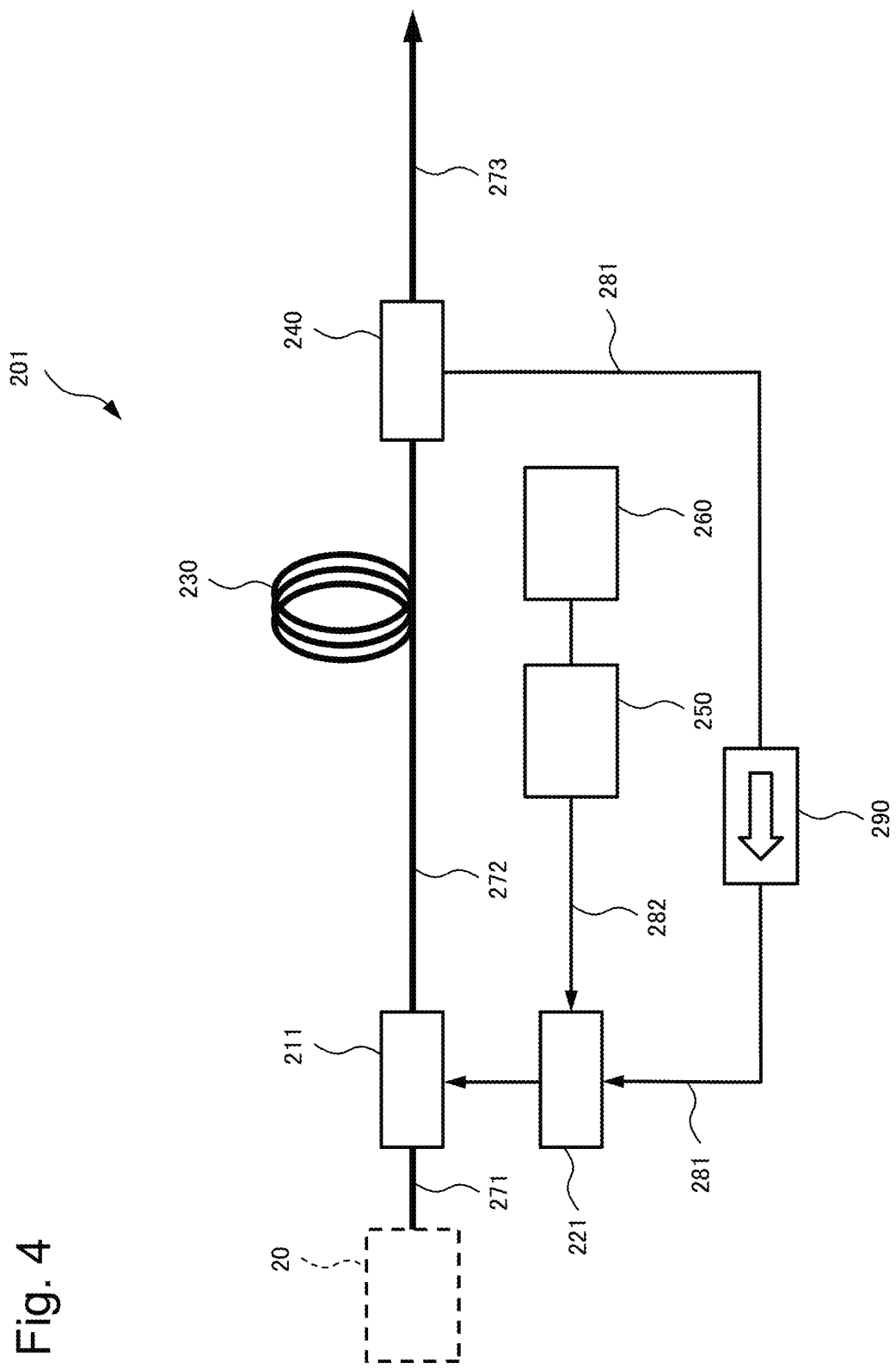

OPTICAL AMPLIFIER AND OPTICAL AMPLIFICATION METHOD

CROSS-REFERENCE TO RELATED PATENT APPLICATIONS

This application is a National Stage Entry of International Application No. PCT/JP2019/015315, filed Apr. 8, 2019, which claims priority from Japanese Patent Application No. 2018-076208, filed Apr. 11, 2018. The entire contents of the above-referenced applications are expressly incorporated herein by reference.

TECHNICAL FIELD

The present invention relates to an optical amplification apparatus and an optical amplification method, and particularly relates to an optical amplification apparatus using a multicore optical fiber and an optical amplification method.

BACKGROUND ART

Expansion of a communication capacity in a core network has been demanded due to rapid expansion of mobile traffic and a video service, and the like. The demand for capacity expansion tends to continue in the future. Up to now, expansion of a communication capacity has been achieved by employing a time multiplexing technique and a wavelength multiplexing technique. The time multiplexing technique and the wavelength multiplexing technique have been applied to an optical communication system by a single-core optical fiber.

When the single-core optical fiber is used, there is a restriction on a multiplexing number of an optical signal being able to be transmitted through a single core, in other words, a single optical fiber core. In recent years, the multiplexing number is about to reach a limit thereof. The limit on the multiplexing number is determined by a wavelength bandwidth usable in optical fiber communication, and input light intensity tolerance of a single-core optical fiber.

In such a situation, in order to further expand the communication capacity, a spatial multiplexing technique being a multiplexing technique of a dimension being different from a conventional multiplexing technique has been developed. In the spatial multiplexing technique, there are a multicore technique of increasing the number of cores per optical fiber, and a multimode technique of increasing the number of propagation modes. Both of the number of cores and the number of modes being used in conventional optical fiber communication are one. Therefore, it is possible to dramatically expand a communication capacity by increasing the number of cores and the number of modes.

However, when the number of cores and the number of modes of an optical fiber are increased, it is impossible to use currently widespread optical transceivers and optical amplifiers without any change. This is because the currently spread optical transceivers and optical amplifiers have been developed for a single-core optical fiber, and do not have compatibility with a multicore optical fiber and a multimode optical fiber. In view of the above, a technique for achieving an optical transceiver and an optical amplifier suitable for a multicore optical fiber and a multimode optical fiber has been proposed.

As an optical amplification method suitable for a multicore optical fiber, there are two methods of a core excitation method and a cladding excitation method. In the core excitation method, an intensity of an optical signal to be optically transmitted through each core is individually amplified for each core by using an individual excitation light source. In the cladding excitation method, an intensity of an optical signal to be optically transmitted through each core is collectively amplified by using a common excitation light source.

In order to efficiently amplify a light intensity of an optical signal being transmitted through a multicore optical fiber, the cladding excitation method of collectively amplifying an intensity of an optical signal to be optically transmitted through each core by using a common excitation light source is desirable. In the cladding excitation method, in principle, it is possible to use a configuration of an optical amplifier based on a conventional single-core excitation method as it is, as a configuration of an optical amplifier based on the cladding excitation method.

PTL 1 describes one example of an optical amplifier based on such a cladding excitation method. A relevant optical fiber amplifier described in PTL 1 includes an optical multiplexer/demultiplexer 3, a wavelength division-multiplexing (WDM) coupler 4, an excitation light source 5, a multimode optical fiber 6, and an optical amplification fiber 7. The relevant optical fiber amplifier further includes a residual excitation light processing unit 8, an optical multiplexer/demultiplexer 9, an optical isolator 10, a connection optical fiber 11, and an amplified spontaneous emission (ASE) cut filter 12.

Herein, the optical amplification fiber 7 is an optical amplification fiber of a double cladding structure that includes a plurality of core portions doped with erbium (Er) being a rare earth element, an inner cladding portion formed on an outer periphery of the core portions, and an outer cladding portion formed on an outer periphery of the inner cladding portion. The relevant optical fiber amplifier is a cladding-excitation-type optical fiber amplifier in which excitation light propagates in a multimode by the inner cladding portion.

The residual excitation light processing unit 8 has a function of processing residual excitation light that propagates through the inner cladding portion, and is output without being used for optical amplification. The optical isolator 10 has a wavelength-dependent light loss characteristic such that residual excitation light that cannot be removed by the residual excitation light processing unit 8 is prevented from passing toward the connection optical fiber 11. The connection optical fiber 11 is configured to input, to an input-side optical fiber of the optical multiplexer/demultiplexer 3, signal light being output from an output-side optical fiber of the optical multiplexer/demultiplexer 9.

In this way, in the relevant cladding-excitation-type optical fiber amplifier, a core portion 7aa and a core portion 7ak in which optical amplification fibers are different are connected to each other in series, and constitute a multi-stage optical amplification fiber structure.

Further, as relevant techniques, there are techniques described in PTLs 2 to 5.

CITATION LIST

Patent Literature

[PTL 1] Japanese Unexamined Patent Application Publication No. 2017-183564
[PTL 2] Japanese Unexamined Patent Application Publication No. 2013-236115
[PTL 3] Japanese Unexamined Patent Application Publication No. 2001-085768

[PTL 4] Japanese Unexamined Patent Application Publication No. 2000-261078
[PTL 5] Japanese Unexamined Patent Application Publication No. H9-160085

SUMMARY OF INVENTION

Technical Problem

In an optical fiber amplifier based on the cladding excitation method as exemplified by the above-described relevant optical fiber amplifier, an absorption efficiency of an excitation light component in an optical amplification medium is about one-tenth of an absorption efficiency based on the core excitation method. Therefore, as compared with the core excitation method, in the optical fiber amplifier based on the cladding excitation method, an amplification efficiency of a light intensity becomes extremely low. A reason for this is described below.

An excitation efficiency of an optical fiber amplifier is proportional to a ratio between cross-sectional areas of a medium through which signal light and excitation light each pass. FIG. 8A illustrates a cross-sectional view of a conventional single-core optical fiber 80 constituted of one core 81 and a clad 82. FIG. 8B illustrates a cross-sectional view of a multicore optical fiber 90 of a double cladding structure in which the number of cores 91 is four, and a first clad 92 and a second clad 93 are formed around the cores 91.

When the multicore optical fiber 90 is used as an optical amplification medium, in the core excitation method, signal light being an excitation target propagates through each of the cores 91, and excitation light propagates through the first clad 92. On the other hand, in a case of the cladding excitation method, an excitation target is the plurality of cores 91 present within the first clad 92, and excitation light propagates through the second clad 93. Therefore, a ratio between cross-sectional areas of the medium through which signal light and excitation light each pass, which determines the excitation efficiency, becomes a ratio between a cross-sectional area of the first clad 92 and a cross-sectional area of the core 91 in a case of the core excitation method. On the other hand, in a case of the cladding excitation method, the ratio between the cross-sectional areas of the medium becomes a ratio between a cross-sectional area of the second clad 93 and the cross-sectional area of the first clad 92. Therefore, the ratio between cross-sectional areas in a case of the core excitation method, and the ratio between cross-sectional areas in a case of the cladding excitation method differ by about ten times.

Herein, when it is assumed that a difference in an absorption efficiency of an excitation light component is about one-tenth, in principle, a light intensity of about a same degree may be acquired by increasing an excitation light intensity by ten times. However, it is extremely difficult to achieve a semiconductor light source capable of increasing an excitation light intensity by ten times. Even when such a semiconductor light source can be achieved, it is obvious that there arises a problem such that a calorific value of a light source may increase, and electric power consumption may increase. In view of such problems, commercialization of an optical amplifier based on the cladding excitation method has not progressed, regardless that an amplification efficiency of a light intensity is excellent.

In this way, since an optical amplifier using a multicore optical fiber has a low absorption efficiency of excitation light in an optical amplification medium in the cladding excitation method, there is a problem that an amplification efficiency of a light intensity may be lowered.

An object of the present invention is to provide an optical amplification apparatus and an optical amplification method that solve a problem being the above-described problem that, in an optical amplifier using a multicore optical fiber, an amplification efficiency of a light intensity is lowered, since an absorption efficiency of excitation light in an optical amplification medium is low in the cladding excitation method.

Solution to Problem

An optical amplification apparatus according to the present invention includes an optical amplification medium, having a gain in a wavelength band of signal light, configured to receive the signal light; excitation light introduction means for introducing, into the optical amplification medium, excitation light to excite the optical amplification medium; and residual excitation light introduction means for introducing, into the optical amplification medium, residual excitation light output from the optical amplification medium, the residual excitation light having a wavelength component of the excitation light.

An optical amplification method according to the present invention includes introducing signal light into an optical amplification medium having a gain in a wavelength band of the signal light; introducing, into the optical amplification medium, excitation light to excite the optical amplification medium; and introducing, into the optical amplification medium, residual excitation light output from the optical amplification medium, the residual excitation light having a wavelength component of the excitation light.

Advantageous Effects of Invention

An optical amplification apparatus and an optical amplification method according to the present invention are able to increase an absorption efficiency of excitation light in an optical amplification medium, and avoid lowering of an amplification efficiency of a light intensity, even when an optical amplifier including a multicore optical fiber is used in a cladding excitation method.

BRIEF DESCRIPTION OF DRAWINGS

FIG. 4 is a block diagram illustrating another configuration of the multicore optical amplifier according to the second example embodiment of the present invention.

EXAMPLE EMBODIMENT

In the following, example embodiments according to the present invention are described with reference to the drawings.

First Example Embodiment

Figure 1:
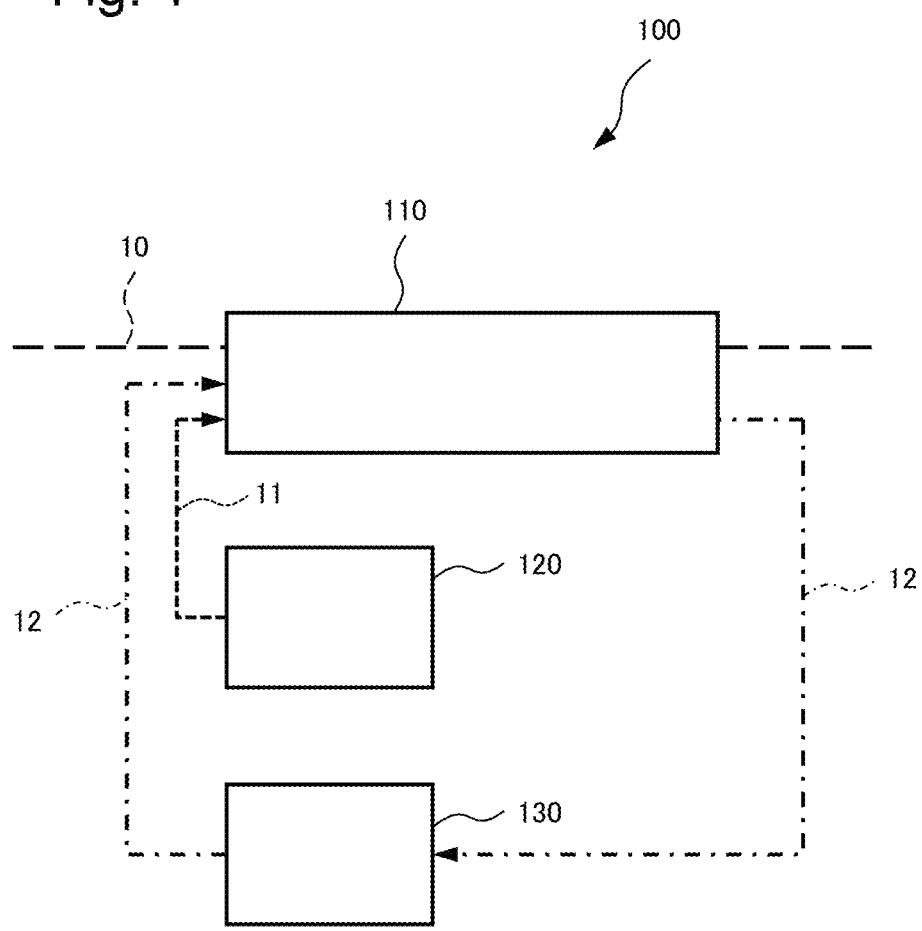
FIG. 1 is a block diagram illustrating a configuration of an optical amplification apparatus according to a first example embodiment of the present invention.

FIG. 1 is a block diagram illustrating a configuration of an optical amplification apparatus 100 according to a first example embodiment of the present invention.

The optical amplification apparatus 100 includes an optical amplification medium 110, an excitation light introduction means 120, and a residual excitation light introduction means 130. The optical amplification medium 110 has a gain in a wavelength band of signal light 10 and receives the signal light 10. The excitation light introduction means 120 introduces, into the optical amplification medium 110, excitation light 11 that excites the optical amplification medium 110. Then, the residual excitation light introduction means 130 introduces, into the optical amplification medium 110, residual excitation light 12 that is output from the optical amplification medium 110 and has a wavelength component of the excitation light 11.

In this way, since the optical amplification apparatus 100 according to the present example embodiment includes the residual excitation light introduction means 130, it is possible to introduce again, into the optical amplification medium 110, excitation light that is output without being absorbed in the optical amplification medium 110, as residual excitation light. Specifically, it is possible to increase an absorption efficiency of excitation light in the optical amplification medium by reusing the excitation light.

Herein, as the optical amplification medium 110, it is possible to use a multicore optical fiber including a core doped with a rare earth ion, and a double cladding structure. At this occasion, the excitation light introduction means 120 can be configured to introduce the excitation light 11 into the optical amplification medium 110, based on the cladding excitation method of causing excitation light to be incident to the double cladding structure.

Next, an optical amplification method according to the present example embodiment is described.

In the optical amplification method according to the present example embodiment, first, signal light is introduced into an optical amplification medium having a gain in a wavelength band of the signal light. Excitation light that excites this optical amplification medium is introduced into the optical amplification medium. At this occasion, residual excitation light that is output from the optical amplification medium and has a wavelength component of the excitation light is introduced into the optical amplification medium.

In this way, in the optical amplification method according to the present example embodiment, excitation light that is output without being absorbed in an optical amplification medium is configured to be introduced again into the optical amplification medium, as residual excitation light. Therefore, it becomes possible to reuse the excitation light, and it is possible to increase an absorption efficiency of the excitation light in the optical amplification medium.

In the optical amplification method according to the present example embodiment, introducing signal light into an optical amplification medium includes introducing the signal light into a multicore optical fiber including a core doped with a rare earth ion, and a double cladding structure. It is possible to introduce excitation light into the optical amplification medium, based on the cladding excitation method at the time of introducing the excitation light into the optical amplification medium.

As described above, the optical amplification apparatus 100 and the optical amplification method according to the present example embodiment are able to increase an absorption efficiency of excitation light in an optical amplification medium, even when an optical amplifier including a multicore optical fiber is used based on the cladding excitation method. Consequently, it is possible to avoid lowering of an amplification efficiency of a light intensity in the optical amplifier.

Second Example Embodiment

Figure 2:
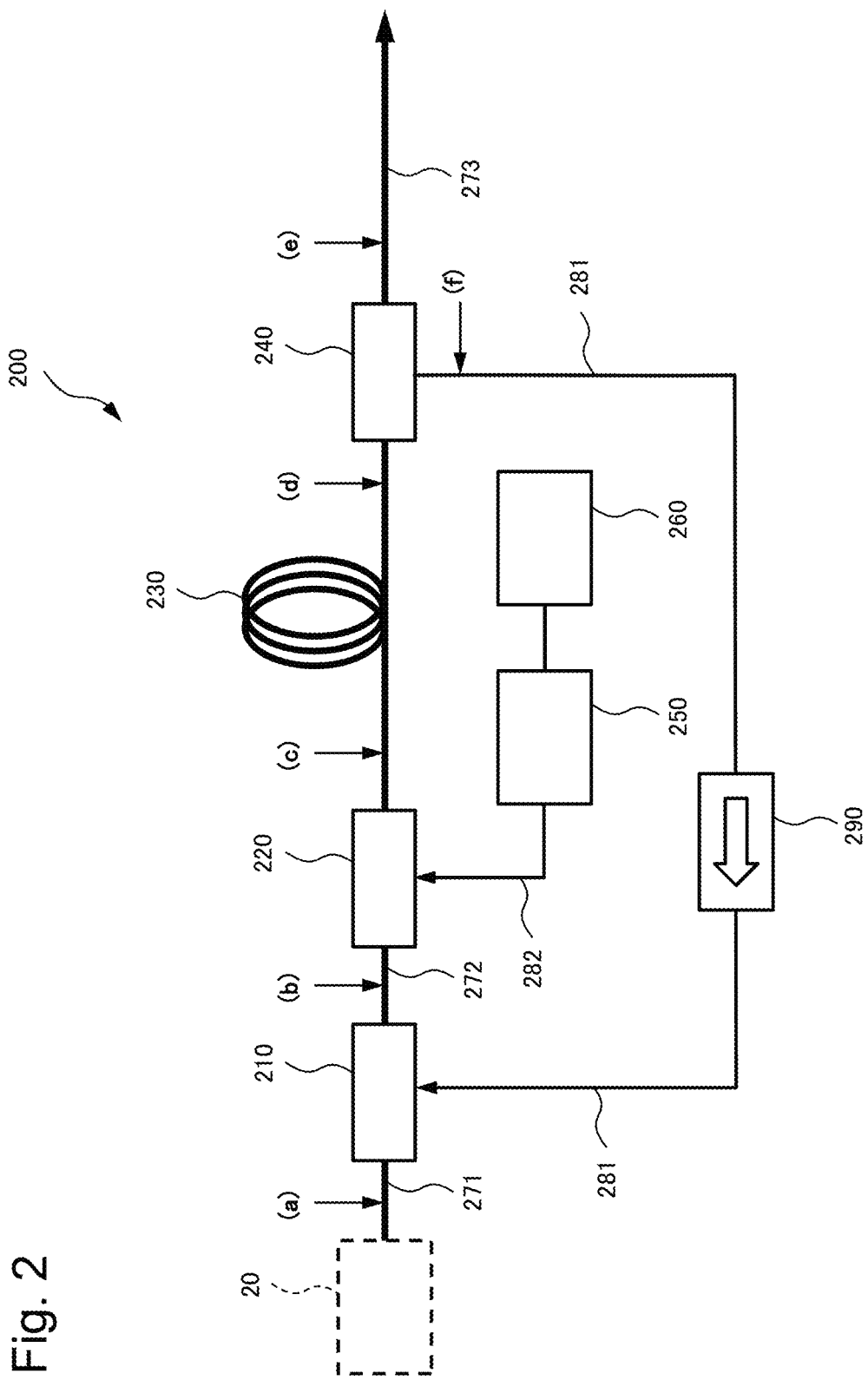
FIG. 2 is a block diagram illustrating a configuration of a multicore optical amplifier according to a second example embodiment of the present invention.

Next, a second example embodiment according to the present invention is described. FIG. 2 illustrates a configuration of a multicore optical amplifier 200 according to the present example embodiment.

The multicore optical amplifier 200 according to the present example embodiment includes a first multiplexer 210, a second multiplexer 220, a multicore erbium doped fiber (MC-EDF) 230 as an optical amplification medium, and a demultiplexer 240. Herein, the multicore erbium doped fiber (MC-EDF) 230 is a multicore optical fiber including a core doped with erbium ion being a rare earth ion, and a double cladding structure. The multicore optical amplifier 200 further includes an excitation light source 250, an excitation light control unit 260, multicore optical fibers 271, 272, and 273, and multimode optical fibers 281 and 282.

In the multicore optical amplifier 200, signal light to be output from a wavelength multiplexing light source 20 is input to the multicore optical fiber 271. The input signal light passes through in the order of the first multiplexer 210, the multicore optical fiber 272, the second multiplexer 220, the multicore erbium doped fiber 230, the demultiplexer 240, and the multicore optical fiber 273, and is output. Herein, the multicore erbium doped fiber 230 as an optical amplification medium has a gain in a wavelength band of signal light and receives the signal light through the multicore optical fibers 271 and 272.

The excitation light source (excitation light generating means) 250 generates excitation light, and outputs, to the multimode optical fiber 282, excitation light of a predetermined intensity by control of the excitation light control unit (excitation light control means) 260. The second multiplexer (wavelength multiplexing means) 220 multiplexes signal light and excitation light. Herein, the excitation light source (excitation light generating means) 250 and the second multiplexer 220 (wavelength multiplexing means) constitute an excitation light introduction means. Specifically, the excitation light introduction means introduces, into the multicore erbium doped fiber 230 (optical amplification medium), excitation light that excites the multicore erbium doped fiber 230 (optical amplification medium). At this occasion, the excitation light introduction means introduces, into the multicore erbium doped fiber 230 (optical amplification medium), the excitation light, based on the cladding excitation method.

By propagation of signal light multiplexed with excitation light through the multicore erbium doped fiber 230, a light intensity of the signal light is amplified. In a process of propagation of excitation light through the multicore erbium doped fiber 230, signal light is amplified depending on the excitation light absorbed in the multicore erbium doped fiber 230. Therefore, as an absorption rate of an excitation light component in the multicore erbium doped fiber 230 increases, a large light intensity amplification gain is acquired.

When it is assumed that an absorption rate of an excitation light component in the multicore erbium doped fiber 230 is constant, as an intensity of excitation light increases, a large light intensity amplification gain is acquired. As another parameter that affects the light intensity amplification gain, there are a length of the multicore erbium doped fiber 230, a concentration of an erbium ion to be doped, and the like. For example, when an absorption amount of an excitation light component by the multicore erbium doped fiber 230 per unit length is small, it is possible to increase the excitation light component to be absorbed by extending the multicore erbium doped fiber 230. However, when the multicore erbium doped fiber 230 is extended, a gain spectrum may cause wavelength shift. Therefore, there is a constraint regarding a length of the multicore erbium doped fiber 230 and an amplification wavelength such that it is necessary to secure a length suitable for a wavelength of signal light being an amplification target. The present example embodiment is described based on a premise that all parameters other than an excitation intensity are optimized for signal light being an amplification target. Specifically, it is assumed that a length of the multicore erbium doped fiber 230 is adjusted in such a way that an amplification gain of signal light is maximized. Therefore, in this case, the light intensity amplification gain becomes proportional to an excitation light intensity and an absorption rate of excitation light in the multicore erbium doped fiber 230.

The excitation light source 250 is driven by the excitation light control unit 260. Specifically, an output light intensity of the excitation light source 250 can be configured to increase in proportion to drive current to be supplied from the excitation light control unit 260. At this occasion, a driving condition of the excitation light source 250 necessary for acquiring a desired light intensity amplification gain, specifically, a relation between a drive current value of an excitation light source and a light intensity amplification gain is acquired by advance measurement. Therefore, as long as a desired light intensity amplification gain is determined, it is possible to derive necessary drive current of the excitation light source 250, specifically, electric power consumption necessary for driving the excitation light source 250.

An excitation light component that is not absorbed in the multicore erbium doped fiber 230, specifically, a residual excitation light component is output from the multicore erbium doped fiber 230 as it is, without contributing to amplification of an intensity of signal light. Herein, the demultiplexer (residual excitation light demultiplexing means) 240 wavelength-demultiplexes signal light and residual excitation light. Thereafter, the signal light passes through the multicore optical fiber 273, and becomes an optical signal output of the multicore optical amplifier 200. On the other hand, the residual excitation light passes through the multimode optical fiber 281 and reaches the first multiplexer 210 (residual excitation light multiplexing means). The first multiplexer 210 (residual excitation light multiplexing means) multiplexes a signal light and the residual excitation light.

Herein, the first multiplexer (residual excitation light multiplexing means) 210 and the demultiplexer (residual excitation light demultiplexing means) 240 constitute a residual excitation light introduction means. The residual excitation light introduction means introduces, into the multicore erbium doped fiber 230 (optical amplification medium), residual excitation light that is output from the multicore erbium doped fiber 230 (optical amplification medium) and has a wavelength component of excitation light. Specifically, the residual excitation light introduction means is configured to include the first multiplexer 210 (residual excitation light multiplexing means) on a side of one end of the multicore erbium doped fiber (optical amplification means) 230, and the demultiplexer (residual excitation light demultiplexing means) 240 on a side of the other end of the multicore erbium doped fiber (optical amplification means) 230.

The residual excitation light introduction means includes the multimode optical fiber 281 that waveguides residual excitation light. As illustrated in FIG. 2, the residual excitation light introduction means can be configured to include an optical isolator 290 that restricts a traveling direction of residual excitation light. By the optical isolator 290, it is possible to prevent that residual excitation light is reflected and an operation of the multicore optical amplifier 200 becomes unstable in a regenerative loop path through which the residual excitation light is supplied from the demultiplexer 240 to the first multiplexer 210.

Next, an operation of the multicore optical amplifier 200 according to the present example embodiment is described.

FIGS. 3A to 3F each illustrate light spectra at each position of the multicore optical amplifier 200 configured as described above. Specifically, FIGS. 3A to 3F each illustrate light spectra at observation points (a) to (f) illustrated in FIG. 2.

Figure 3A:
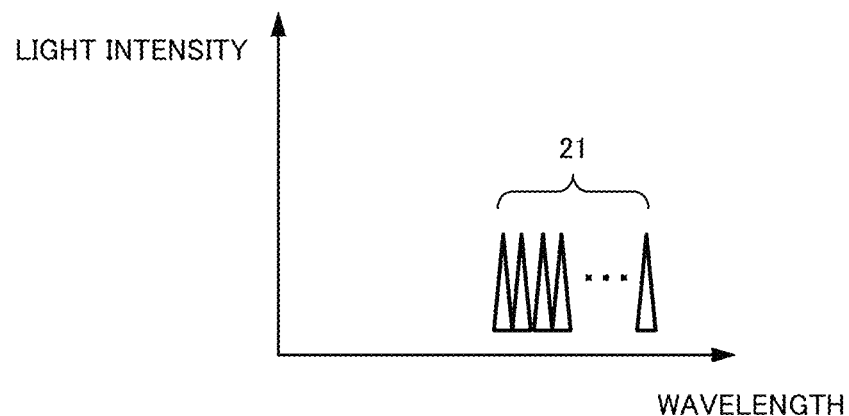
FIG. 3A is a diagram for describing an operation of the multicore optical amplifier according to the second example embodiment of the present invention, and is a diagram illustrating a light spectrum at an observation point (a).
Figure 3B:
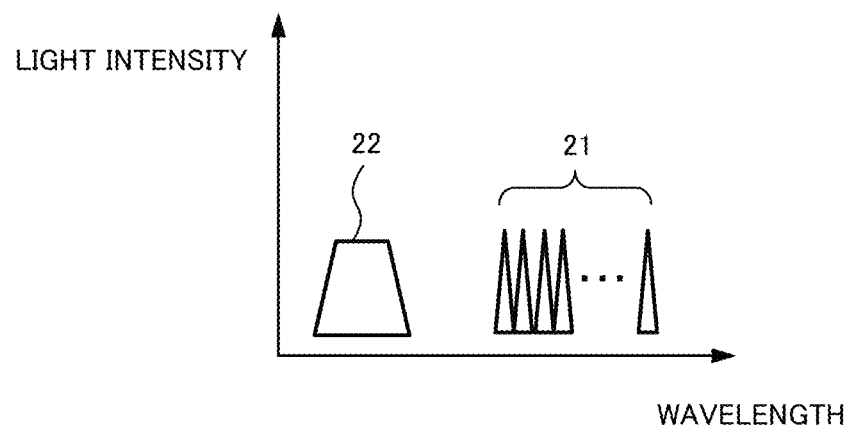
FIG. 3B is a diagram for describing an operation of the multicore optical amplifier according to the second example embodiment of the present invention, and is a diagram illustrating a light spectrum at an observation point (b).
Figure 3C:
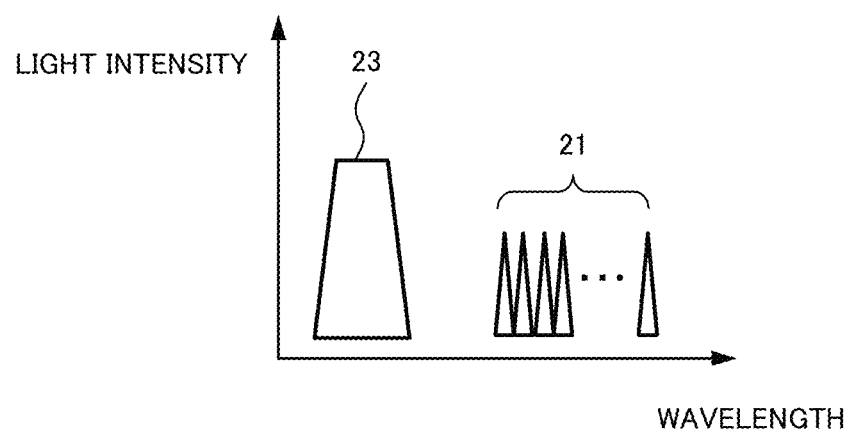
FIG. 3C is a diagram for describing an operation of the multicore optical amplifier according to the second example embodiment of the present invention, and is a diagram illustrating a light spectrum at an observation point (c).

As illustrated in FIG. 3A, at the observation point (a), only wavelength-multiplexed signal light 21 output from the wavelength multiplexing light source 20 is observed. As illustrated in FIG. 3B, at the observation point (b), when residual excitation light is present, residual excitation light 22 is observed in addition to the wavelength-multiplexed signal light 21. As illustrated in FIG. 3C, at the observation point (c), when excitation light is supplied from the excitation light source 250, an excitation light component is observed. Herein, when a residual excitation light component is present, an excitation light component is added by the excitation light source 250, and thus an intensity of combined excitation light 23 to be observed at the observation point (c) becomes larger than an intensity of the residual excitation light 22 to be observed at the observation point (b).

Figure 3D:
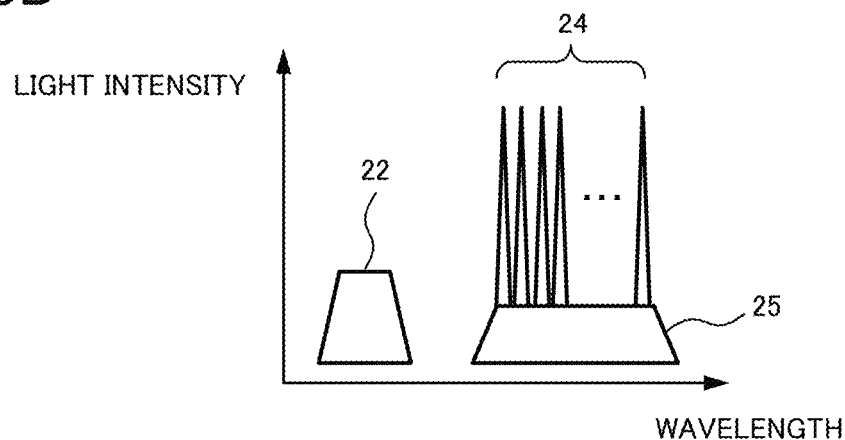
FIG. 3D is a diagram for describing an operation of the multicore optical amplifier according to the second example embodiment of the present invention, and is a diagram illustrating a light spectrum at an observation point (d).

As illustrated in FIG. 3D, at the observation point (d), the residual excitation light 22 being an excitation light component that is not absorbed in the multicore erbium doped fiber 230, amplified multiplexed signal light 24 being an amplified signal light component, and a light noise component 25 generated in a process of an optical amplification operation, are observed. This light noise component 25 co-exists with the signal light component in a same wavelength band, and affects a noise index of the multicore optical amplifier 200.

Figure 3E:
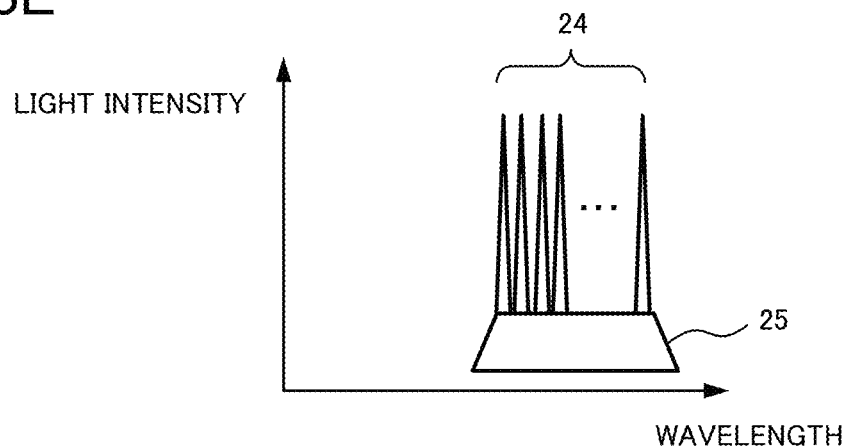
FIG. 3E is a diagram for describing an operation of the multicore optical amplifier according to the second example embodiment of the present invention, and is a diagram illustrating a light spectrum at an observation point (e).
Figure 3F:
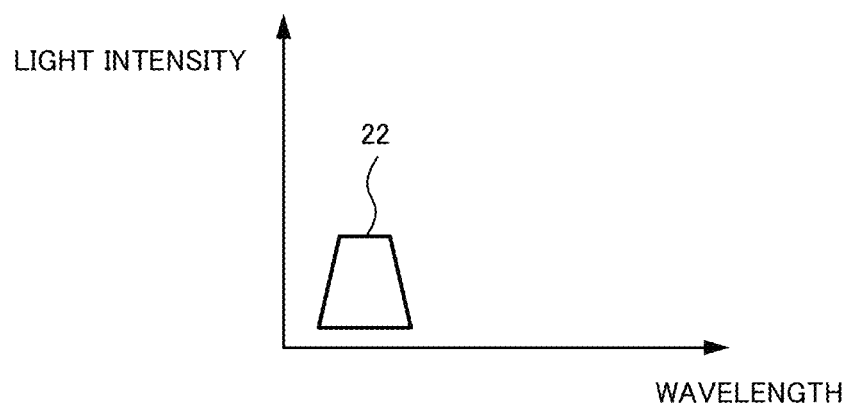
FIG. 3F is a diagram for describing an operation of the multicore optical amplifier according to the second example embodiment of the present invention, and is a diagram illustrating a light spectrum at an observation point (f).

At a later stage of the multicore erbium doped fiber 230, the demultiplexer 240 demultiplexes signal light and residual excitation light. Therefore, as illustrated in FIG. 3E, at the observation point (e), an excitation light component is not observed, and only the amplified multiplexed signal light 24 being a signal light component, and the light noise component 25 are observed. The residual excitation light 22 demultiplexed by the demultiplexer 240 is output from the multimode optical fiber 281. Therefore, as illustrated in FIG. 3F, at the observation point (f), only the residual excitation light 22 is observed.

As described above, a feature of the multicore optical amplifier 200 according to the present example embodiment is such that a regenerative path connected from the demultiplexer 240 to the first multiplexer 210 is present. As is clear from FIGS. 3B and 3C, the presence of the regenerative path enables regenerating and reusing residual excitation light. Specifically, since it is possible to add residual excitation light to an output from the excitation light source 250, even when drive current of the excitation light source 250 is decreased, it is possible to acquire a desired optical amplification gain. Specifically, an amplification efficiency of a light intensity is improved, and it is possible to reduce electric power consumption necessary for acquiring a desired optical amplification gain.

In this way, the multicore optical amplifier 200 according to the present example embodiment is able to reduce electric power consumption necessary for driving an excitation light source by improving an absorption efficiency of excitation light in an optical amplification medium. Further, since it is possible to reduce a calorific value of an element constituting an excitation light source, it is also possible to reduce electric power consumption of an electric circuit necessary for cooling the element constituting the excitation light source. Therefore, electric power consumption of the entire optical amplifier can be significantly reduced.

As illustrated in FIG. 2, in the above-described multicore optical amplifier 200, the second multiplexer 220 (wavelength multiplexing means) is configured to multiplex signal light and excitation light. However, the present example embodiment is not limited to the above. As exemplified by a multicore optical amplifier 201 illustrated in FIG. 4, the present example embodiment may be configured to include an excitation light multiplexer (excitation light multiplexing means) 221 that multiplexes excitation light generated by the excitation light source (excitation light generating means) 250 and residual excitation light. Herein, the excitation light source (excitation light generating means) 250 and the excitation light multiplexer (excitation light multiplexing means) 221 constitute an excitation light introduction means. At this occasion, a first multiplexer (residual excitation light multiplexing means) 211 constituting a residual excitation light introduction means introduces, into the multicore erbium doped fiber 230 (optical amplification medium), residual excitation light after having been multiplexed with excitation light by the excitation light multiplexer (excitation light multiplexing means) 221.

In the multicore optical amplifier 200 illustrated in FIG. 2, what is input to the second multiplexer 220 is signal light and excitation light. Since wavelengths of the signal light and the excitation light are different from each other, the second multiplexer 220 needs to have a wavelength multiplexing function. Contrary to this, in the multicore optical amplifier 201 illustrated in FIG. 4, what is input to the excitation light multiplexer 221 is excitation light to be output from the excitation light source 250 and residual excitation light to be regenerated from the demultiplexer 240 through the multimode optical fiber 281. In other words, what is input to the excitation light multiplexer 221 is excitation light in any case and has a same wavelength. Therefore, a wavelength multiplexing function is not necessary in the excitation light multiplexer 221.

FIGS. 2 and 4 illustrate configurations of the multicore optical amplifiers 200 and 201 based on a forward excitation method in which propagating directions of signal light and excitation light are the same. However, the present example embodiment is not limited to the above. The present example embodiment may be constituted based on a backward excitation method in which a propagating direction of signal light is opposite to that of excitation light. In this case, whereas a loop for regenerating residual excitation light is clockwise in a case of the forward excitation method, the loop is counterclockwise in a case of the backward excitation method, and a similar advantageous effect is acquired.

Next, an optical amplification method according to the present example embodiment is described.

In the optical amplification method according to the present example embodiment, first, signal light is introduced into an optical amplification medium having a gain in a wavelength band of the signal light. Excitation light that excites the optical amplification medium is introduced into the optical amplification medium. At this occasion, residual excitation light that is output from the optical amplification medium and has a wavelength component of the excitation light is introduced into the optical amplification medium. A configuration so far is similar to that in the optical amplification method according to the first example embodiment.

In the optical amplification method according to the present example embodiment, at the time of introducing the above-described residual excitation light into an optical amplification medium, it is configured to multiplex signal light and the residual excitation light on a side of one end of the optical amplification medium, and wavelength-demultiplex the signal light and the residual excitation light on a side of the other end of the optical amplification medium.

At the time of introducing the excitation light into the optical amplification medium, it is possible to configure to multiplex the signal light and the excitation light. Alternatively, the residual excitation light may be introduced into the optical amplification medium by multiplexing the excitation light and the residual excitation light at the time of introducing the excitation light into the optical amplification medium, and introducing, into the optical amplification medium, the residual excitation light after having been multiplexed with the excitation light.

At the time of introducing the residual excitation light into the optical amplification medium, the residual excitation light may be introduced into a multimode optical fiber for waveguiding, and at this occasion, a traveling direction of the residual excitation light may be restricted.

As described above, the multicore optical amplifiers 200 and 201, and the optical amplification method according to the present example embodiment are able to increase an absorption efficiency of excitation light in an optical amplification medium, even when an optical amplifier including a multicore optical fiber is used based on the cladding excitation method. Consequently, it is possible to avoid lowering of an amplification efficiency of a light intensity in the optical amplifier.

Third Example Embodiment

Figure 5:
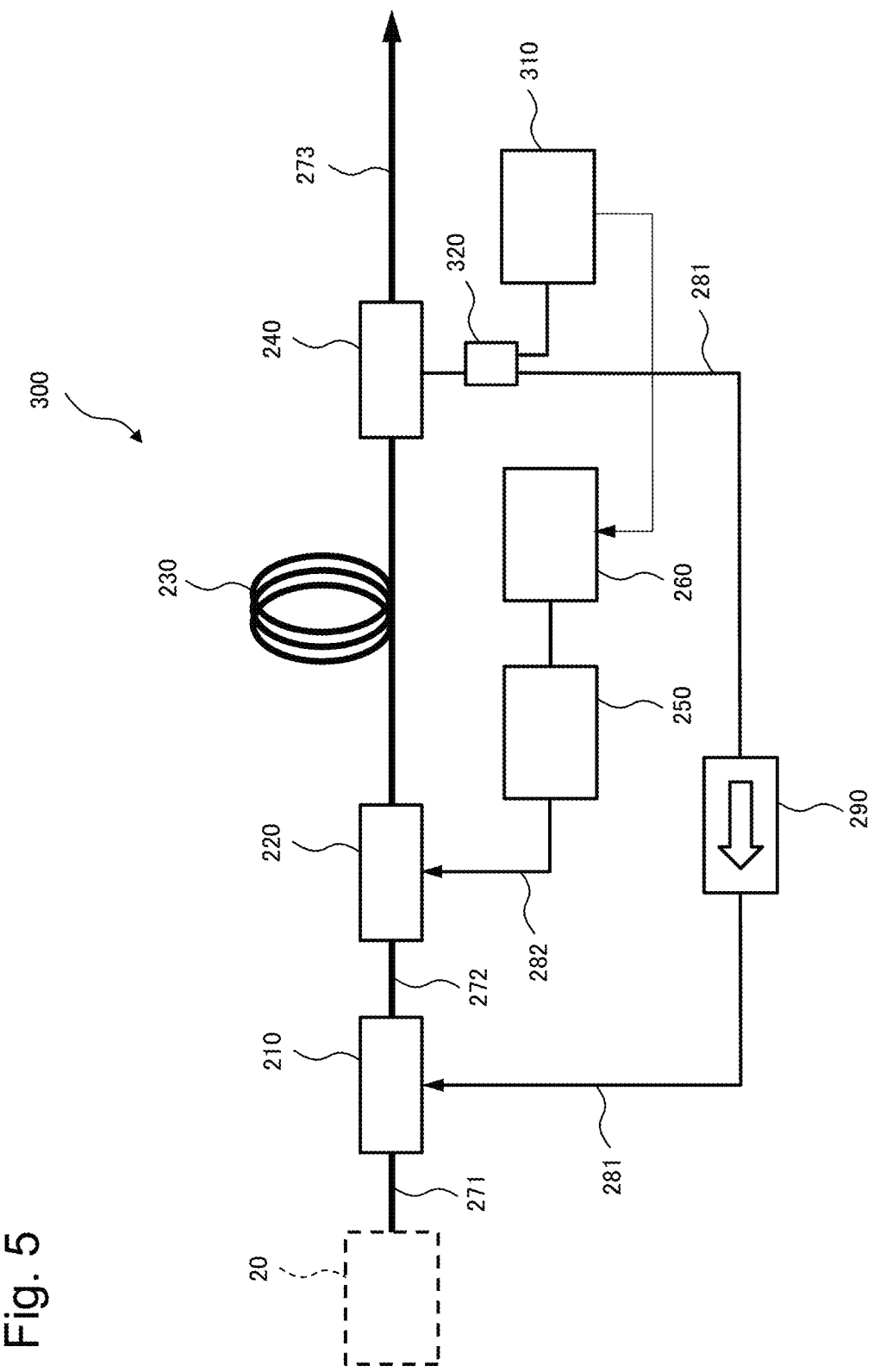
FIG. 5 is a block diagram illustrating a configuration of a multicore optical amplifier according to a third example embodiment of the present invention.

Next, a third example embodiment according to the present invention is described. FIG. 5 illustrates a configuration of a multicore optical amplifier 300 according to the present example embodiment.

The multicore optical amplifier 300 according to the present example embodiment includes a first multiplexer 210, a second multiplexer 220, a multicore erbium doped fiber 230 as an optical amplification medium, and a demultiplexer 240. The multicore optical amplifier 300 further includes an excitation light source 250, an excitation light control unit 260, multicore optical fibers 271, 272, and 273, and multimode optical fibers 281 and 282. FIG. 5 illustrates a configuration in which an optical isolator 290 is provided on a path of the multimode optical fiber 281. A configuration so far is similar to a configuration of the multicore optical amplifier 200 according to the second example embodiment.

The multicore optical amplifier 300 according to the present example embodiment is further configured to include a light intensity monitor (residual excitation light monitoring means) 310 that monitors a light intensity of residual excitation light that is wavelength-demultiplexed by the demultiplexer 240. Herein, as illustrated in FIG. 5, it is possible to use an optical coupler 320 in order to introduce a part of residual excitation light into the light intensity monitor 310.

In this case, the light intensity monitor 310 notifies the excitation light control unit (excitation light control means) 260 of the intensity of residual excitation light. Then, the excitation light control unit 260 controls the excitation light source (excitation light generating means) 250, based on a monitoring result of the light intensity monitor 310. Specifically, the excitation light control unit 260 can be configured to control drive current of the excitation light source 250 depending on an intensity of residual excitation light to be notified from the light intensity monitor 310.

Next, an operation of the multicore optical amplifier 300 according to the present example embodiment is described.

First, an operation of a case where the excitation light source 250 is suspended after having been driven for a predetermined time τ is described.

Excitation light output from the excitation light source 250 passes through the multicore erbium doped fiber 230, and circulates through a regenerative loop path extending from the demultiplexer 240 to the first multiplexer 210 through the multimode optical fiber 281. In a process of this circulation, since a predetermined component of residual excitation light is absorbed in the multicore erbium doped fiber 230, an intensity of the excitation light is gradually attenuated each time the excitation light circulates. Then, when the intensity of the residual excitation light falls below a predetermined value, it becomes unable to achieve a desired optical amplification gain.

In view of the above, in order to continue securing the desired optical amplification gain, driving of the excitation light source 250 that is suspended is resumed. Then, the excitation light source 250 is controlled in such a way that an intensity of excitation light passing through the multicore erbium doped fiber 230 can be kept to a predetermined value or higher and to an appropriate value.

In this way, by the light intensity monitor 310 and the optical coupler 320, it is possible to control in such a way that an optical amplification gain of the multicore optical amplifier 300 can be kept to a desired value temporally.

Specifically, it is possible to know an intensity of residual excitation light by extracting a part of the residual excitation light passing through the regenerative loop path by the optical coupler 320, and observing the part of the residual excitation light by the light intensity monitor 310. Then, the excitation light control unit 260 increases or decreases drive current of the excitation light source 250 depending on the intensity of the residual excitation light to be notified from the light intensity monitor 310. At this occasion, it is possible to control the intensity of excitation light to be output from the excitation light source 250 in such a way as to compensate for attenuation of the intensity of the residual excitation light to be input again to the multicore erbium doped fiber 230 through the regenerative loop path. Herein, the excitation light control unit (excitation light control means) 260 can be configured to control the excitation light source (excitation light generating means) 250 in such a way that a sum of the light intensity of the excitation light and the light intensity of the residual excitation light becomes constant. Specifically, drive current of the excitation light source 250 may be controlled in such a way that a sum of an excitation light intensity to be output from the excitation light source 250 and a residual excitation light intensity to be monitored by the light intensity monitor 310 becomes constant. The excitation light control unit 260 may know a drive current value for acquiring a desired excitation light intensity by acquiring in advance information relating to a relation between drive current and an output light intensity of the excitation light source 250.

Figure 6:
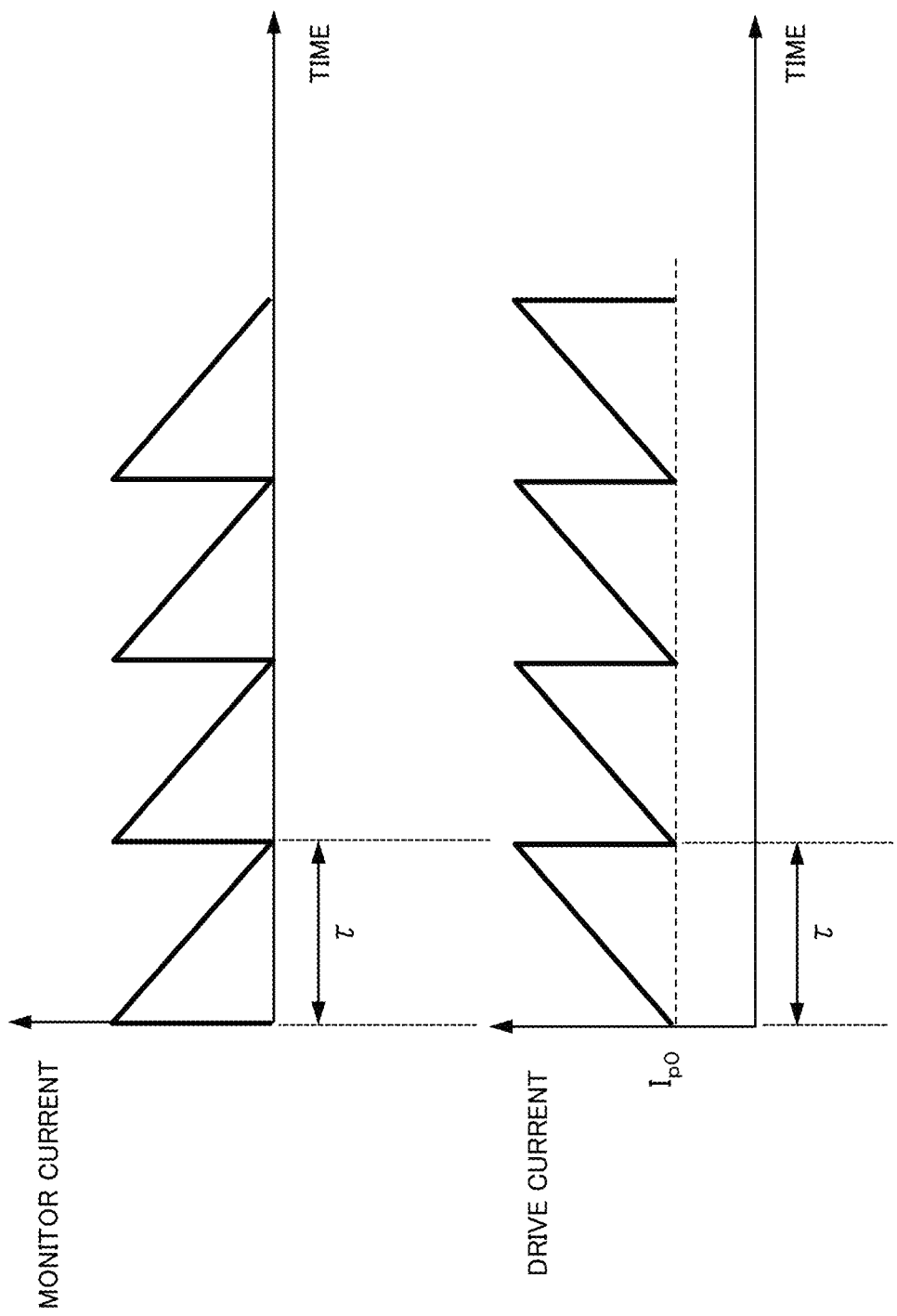
FIG. 6 is diagrams for describing an operation of the multicore optical amplifier according to the third example embodiment of the present invention, and each diagram illustrates timewise changes of monitor current of a light intensity monitor and drive current of an excitation light source.

With reference to FIG. 6, an example of controlling drive current of the excitation light source 250 in such a way that a sum of an intensity of excitation light to be output from the excitation light source 250 and an intensity of residual excitation light monitored by the light intensity monitor 310 becomes constant is described. An upper portion of FIG. 6 illustrates a timewise change of monitor current of the light intensity monitor 310, and a lower portion of FIG. 6 illustrates a timewise change of drive current of the excitation light source 250, respectively. In FIG. 6, "τ" denotes a time during which the excitation light source 250 generates excitation light, and "$I_{p0}$" denotes a threshold current value.

A monitor current value Im of the light intensity monitor 310 is determined by an intensity of residual excitation light passing through the regenerative loop path. When monitor current is timewise changed as illustrated in FIG. 6, the excitation light control unit 260 controls a magnitude of a drive current value Ip in such a way that a sum of the monitor current value Im and a drive current value Ip becomes a predetermined value (Im+Ip=predetermined value). By such an operation, it is possible to make an excitation light component passing through the multicore erbium doped fiber 230 constant temporally. Consequently, it is possible to control in such a way that a light output of the multicore optical amplifier 300 becomes constant temporally.

When there is no regeneration of residual excitation light, the monitor current value Im becomes constantly zero temporally (Im=0). Therefore, electric power (drive current value Ip) necessary for driving the excitation light source 250 decreases by a supplied amount of the monitor current value Im. Consequently, it becomes possible to keep an intensity of output light constant, while electric power consumption of the multicore optical amplifier 300 is reduced.

Figure 7:
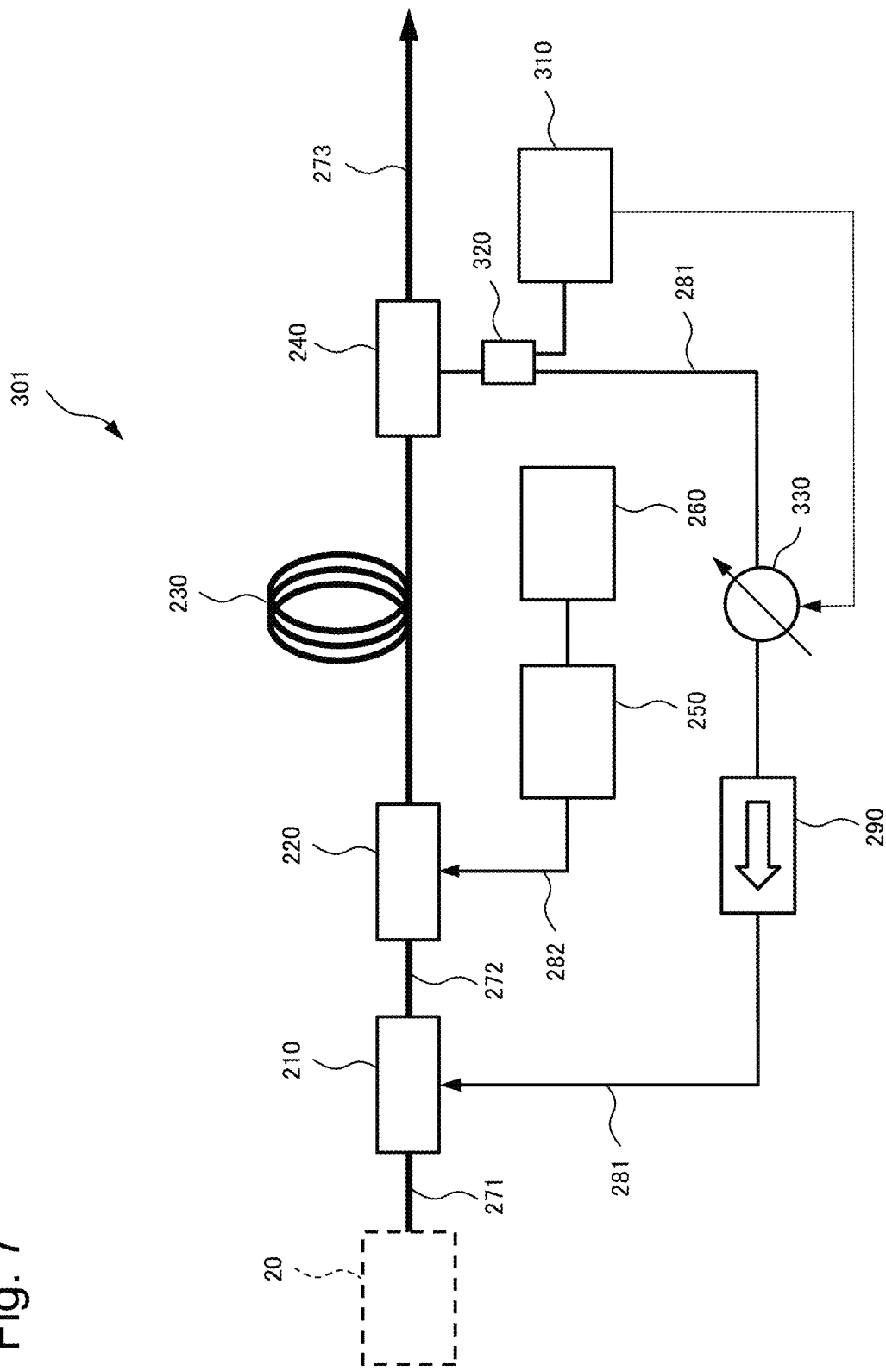
FIG. 7 is a block diagram illustrating another configuration of the multicore optical amplifier according to the third example embodiment of the present invention.
Figure 8A:
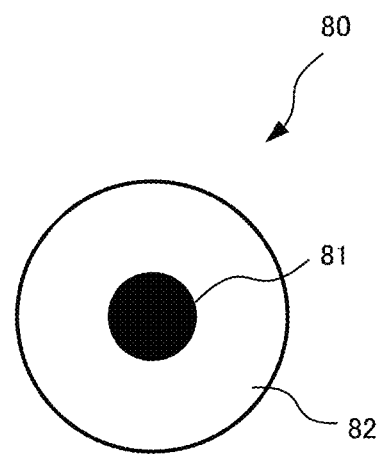
FIG. 8A is a cross-sectional view of a conventional single-core optical fiber.
Figure 8B:
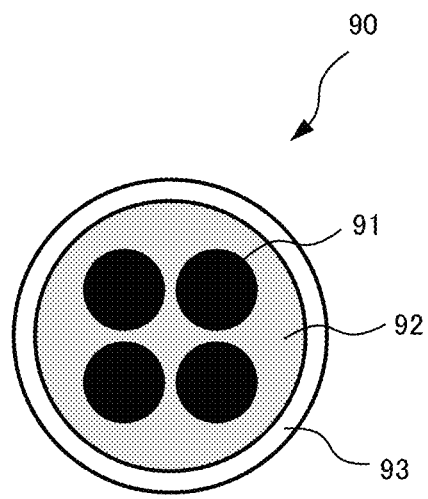
FIG. 8B is a cross-sectional view of a multicore optical fiber of a double cladding structure.

The multicore optical amplifier 300 illustrated in FIG. 5 is configured to include the light intensity monitor 310 that monitors a light intensity of residual excitation light, and in such a way that the excitation light control unit 260 controls the excitation light source 250, based on a monitoring result of the light intensity monitor 310. The present example embodiment is not limited to the above. The present example embodiment may be configured to include a light intensity monitor (residual excitation light monitoring means) 310 that monitors a light intensity of residual excitation light and an optical attenuator (optical attenuating means) 330 that attenuates the light intensity of the residual excitation light, as exemplified by a multicore optical amplifier 301 illustrated in FIG. 7. In this case, the optical attenuator (optical attenuating mean) 330 constitutes a part of a residual excitation light introduction means. Herein, an attenuation rate of the optical attenuator (optical attenuating means) 330 can be configured to be determined, based on a monitoring result of the light intensity monitor (residual excitation light monitoring means) 310 in such a way that a sum of a light intensity of excitation light and a light intensity of residual excitation light becomes constant.

Next, an optical amplification method according to the present example embodiment is described.

In the optical amplification method according to the present example embodiment, first, signal light is introduced into an optical amplification medium having a gain in a wavelength band of the signal light. Excitation light that excites the optical amplification medium is introduced into the optical amplification medium. At this occasion, residual excitation light that is output from the optical amplification medium and has a wavelength component of the excitation light is introduced into the optical amplification medium. A configuration so far is similar to that in the optical amplification method according to the first example embodiment.

The optical amplification method according to the present example embodiment is configured to monitor a light intensity of residual excitation light and control a light intensity of excitation light, based on a result of the monitoring. At this occasion, it is possible to control in such a way that a sum of the light intensity of the excitation light and the light intensity of the residual excitation light becomes constant at the time of controlling the light intensity of the excitation light.

It may also be possible to monitor a light intensity of residual excitation light, and attenuate the light intensity of the residual excitation light, based on a monitoring result in such a way that a sum of the light intensity of the excitation light and the light intensity of the residual excitation light becomes constant at the time of introducing the residual excitation light into the optical amplification medium.

As described above, the multicore optical amplifiers 300 and 301, and the optical amplification method according to the present example embodiment are able to increase an absorption efficiency of excitation light in an optical amplification medium, even when an optical amplifier including a multicore optical fiber is used based on the cladding excitation method. Consequently, it is possible to avoid lowering of an amplification efficiency of a light intensity in the optical amplifier.

The whole or part of the example embodiments disclosed above can be described as, but not limited to, the following supplementary notes.

(Supplementary Note 1) An optical amplification apparatus comprising: an optical amplification medium, having a gain in a wavelength band of signal light, configured to receive the signal light; excitation light introduction means for introducing, into the optical amplification medium, excitation light to excite the optical amplification medium; and residual excitation light introduction means for introducing, into the optical amplification medium, residual excitation light output from the optical amplification medium, the residual excitation light having a wavelength component of the excitation light.

(Supplementary Note 2) The optical amplification apparatus according to claim 1, wherein the residual excitation light introduction means includes residual excitation light multiplexing means for multiplexing the signal light and the residual excitation light on a side of one end of the optical amplification medium, and residual excitation light demultiplexing means for wavelength-demultiplexing the signal light and the residual excitation light on a side of another end of the optical amplification medium.

(Supplementary Note 3) The optical amplification apparatus according to claim 1 or 2, wherein the excitation light introduction means includes excitation light generating means for generating the excitation light, and wavelength multiplexing means for multiplexing the signal light and the excitation light.

(Supplementary Note 4) The optical amplification apparatus according to claim 1 or 2, wherein the excitation light introduction means includes excitation light generating means for generating the excitation light, and excitation light multiplexing means for multiplexing the excitation light and the residual excitation light, and the residual excitation light introduction means introduces, into the optical amplification medium, the residual excitation light with which the excitation light multiplexing means has multiplexed the excitation light.

(Supplementary Note 5) The optical amplification apparatus according to claim 3 or 4, further comprising: residual excitation light monitoring means for monitoring light intensity of the residual excitation light; and excitation light control means for controlling the excitation light generating means, based on a monitoring result of the residual excitation light monitoring means.

(Supplementary Note 6) The optical amplification apparatus according to claim 5, wherein the excitation light control means controls the excitation light generating means in such a way that a sum of light intensity of the excitation light and light intensity of the residual excitation light becomes constant.

(Supplementary Note 7) The optical amplification apparatus according to any one of claims 1 to 4, further comprising residual excitation light monitoring means for monitoring light intensity of the residual excitation light, wherein the residual excitation light introduction means includes optical attenuating means for attenuating light intensity of the residual excitation light, and an attenuation rate of the optical attenuating means is determined based on a monitoring result of the residual excitation light monitoring means, in such a way that a sum of light intensity of the excitation light and light intensity of the residual excitation light becomes constant.

(Supplementary Note 8) The optical amplification apparatus according to any one of claims 1 to 7, wherein the residual excitation light introduction means includes a multimode optical fiber configured to waveguide the residual excitation light, and an optical isolator configured to restrict a traveling direction of the residual excitation light.

(Supplementary Note 9) The optical amplification apparatus according to any one of claims 1 to 8, wherein the optical amplification medium is composed of a multicore optical fiber including a core doped with a rare earth ion and a double cladding structure, and the excitation light introduction means introduces the excitation light into the optical amplification medium by a cladding excitation method.

(Supplementary Note 10) An optical amplification method comprising: introducing signal light into an optical amplification medium having a gain in a wavelength band of the signal light; introducing, into the optical amplification medium, excitation light to excite the optical amplification medium; and introducing, into the optical amplification medium, residual excitation light output from the optical amplification medium, the residual excitation light having a wavelength component of the excitation light.

(Supplementary Note 11) The optical amplification method according to supplementary note 10, wherein the introducing the residual excitation light into the optical amplification medium includes multiplexing the signal light and the residual excitation light on a side of one end of the optical amplification medium, and wavelength-demultiplexing the signal light and the residual excitation light on a side of another end of the optical amplification medium.

(Supplementary Note 12) The optical amplification method according to supplementary note 10 or 11, wherein the introducing the excitation light into the optical amplification medium includes multiplexing the signal light and the excitation light.

(Supplementary Note 13) The optical amplification method according to claim 10 or 11, wherein the introducing the excitation light into the optical amplification medium includes multiplexing the excitation light and the residual excitation light, and the introducing the residual excitation light into the optical amplification medium includes introducing, into the optical amplification medium, the residual excitation light having been multiplexed with the excitation light.

(Supplementary Note 14) The optical amplification method according to any one of claims 10 to 13, further comprising: monitoring light intensity of the residual excitation light; and controlling light intensity of the excitation light, based on a result of the monitoring.

(Supplementary Note 15) The optical amplification method according to claim 14, wherein the controlling light intensity of the excitation light includes controlling in such a way that a sum of light intensity of the excitation light and light intensity of the residual excitation light becomes constant.

(Supplementary Note 16) The optical amplification method according to any one of claims 10 to 13, further comprising monitoring light intensity of the residual excitation light, wherein the introducing the residual excitation light into the optical amplification medium includes attenuating light intensity of the residual excitation light, based on a result of the monitoring, in such a way that a sum of light intensity of the excitation light and light intensity of the residual excitation light becomes constant.

(Supplementary Note 17) The optical amplification method according to any one of supplementary notes 10 to 16, wherein the introducing the residual excitation light into the optical amplification medium includes introducing the residual excitation light into a multimode optical fiber for waveguiding, and restricting a traveling direction of the residual excitation light.

(Supplementary Note 18) The optical amplification method according to any one of claims 10 to 17, wherein the introducing the signal light into the optical amplification medium includes introducing the signal light into a multicore optical fiber including a core doped with a rare earth ion and a double cladding structure, and the introducing the excitation light into the optical amplification medium includes introducing the excitation light into the optical amplification medium by a cladding excitation method.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

This application is based upon and claims the benefit of priority from Japanese patent application No. 2018-076208, filed on Apr. 11, 2018, the disclosure of which is incorporated herein in its entirety by reference.

REFERENCE SIGNS LIST

100 Optical amplification apparatus
110 Optical amplification medium
120 Excitation light introduction means
130 Residual excitation light introduction means
200, 201, 300, 301 Multicore optical amplifier
210, 211 First multiplexer
220 Second multiplexer
221 Excitation light multiplexer
230 Multicore erbium-doped fiber
240 Demultiplexer
250 Excitation light source
260 Excitation light control unit
271, 272, 273 Multicore optical fiber
281, 282 Multimode optical fiber
290 Optical isolator
310 Light intensity monitor
320 Optical coupler
330 Optical attenuator
10 Signal light
11 Excitation light
12 Residual excitation light
20 Wavelength multiplexing light source
21 Wavelength-multiplexed signal light
22 Residual excitation light
23 Combined excitation light
24 Amplified multiplexed signal light
25 Light noise component
80 Single-core optical fiber
81, 91 Core
82 Clad
90 Multicore optical fiber
92 First clad
93 Second clad

The invention claimed is:
1. An optical amplification apparatus comprising:
an optical amplification medium, having a gain in a wavelength band of signal light, configured to receive the signal light;

an excitation light introduction unit configured to introduce, into the optical amplification medium, excitation light to excite the optical amplification medium; and a residual excitation light introduction unit configured to introduce, into the optical amplification medium, residual excitation light output from the optical amplification medium, the residual excitation light having a wavelength component of the excitation light, wherein the excitation light introduction unit controls the excitation light based on a light intensity of the residual excitation light, and the residual excitation light introduction unit includes a residual excitation light multiplexing unit configured to multiplex the signal light and the residual excitation light on a side of one end of the optical amplification medium, and a residual excitation light demultiplexing unit configured to wavelength-demultiplex the signal light and the residual excitation light on a side of another end of the optical amplification medium.

2. The optical amplification apparatus according to claim 1, wherein the excitation light introduction unit includes an excitation light generating unit configured to generate the excitation light, and a wavelength multiplexing unit configured to multiplex the signal light and the excitation light.

3. The optical amplification apparatus according to claim 1, wherein the excitation light introduction unit includes an excitation light generating unit configured to generate the excitation light, and an excitation light multiplexing unit configured to multiplex the excitation light and the residual excitation light, and the residual excitation light introduction unit introduces, into the optical amplification medium, the residual excitation light with which the excitation light multiplexing unit has multiplexed the excitation light.

4. The optical amplification apparatus according to claim 2, further comprising:

a residual excitation light monitoring unit configured to monitor the light intensity of the residual excitation light; and an excitation light control unit configured to control the excitation light generating unit, based on a monitoring result of the residual excitation light monitoring unit.

5. The optical amplification apparatus according to claim 4, wherein the excitation light control unit controls the excitation light generating unit in such a way that a sum of a light intensity of the excitation light and the light intensity of the residual excitation light becomes constant.

6. The optical amplification apparatus according to claim 1, further comprising a residual excitation light monitoring unit configured to monitor the light intensity of the residual excitation light, wherein the residual excitation light introduction unit includes an optical attenuating unit configured to attenuate the light intensity of the residual excitation light, and an attenuation rate of the optical attenuating unit is determined based on a monitoring result of the residual excitation light monitoring unit, in such a way that a sum of a light intensity of the excitation light and the light intensity of the residual excitation light becomes constant.

7. The optical amplification apparatus according to claim 1, wherein the residual excitation light introduction unit includes a multimode optical fiber configured to waveguide the residual excitation light, and an optical isolator configured to restrict a traveling direction of the residual excitation light.

8. The optical amplification apparatus according to claim 1, wherein the optical amplification medium is composed of a multicore optical fiber including a core doped with a rare earth ion and a double cladding structure, and the excitation light introduction unit introduces the excitation light into the optical amplification medium by a cladding excitation method.

9. An optical amplification method comprising:

introducing signal light into an optical amplification medium having a gain in a wavelength band of the signal light;

introducing, into the optical amplification medium, excitation light to excite the optical amplification medium;

introducing, into the optical amplification medium, residual excitation light output from the optical amplification medium, the residual excitation light having a wavelength component of the excitation light; and controlling the excitation light based on a light intensity of the residual excitation light, wherein the introducing the residual excitation light into the optical amplification medium includes multiplexing the signal light and the residual excitation light on a side of one end of the optical amplification medium, and wavelength-demultiplexing the signal light and the residual excitation light on a side of another end of the optical amplification medium.

10. The optical amplification method according to claim 9, wherein the introducing the excitation light into the optical amplification medium includes multiplexing the signal light and the excitation light.

11. The optical amplification method according to claim 9, wherein the introducing the excitation light into the optical amplification medium includes multiplexing the excitation light and the residual excitation light, and the introducing the residual excitation light into the optical amplification medium includes introducing, into the optical amplification medium, the residual excitation light having been multiplexed with the excitation light.

12. The optical amplification method according to claim 9, further comprising:

monitoring the light intensity of the residual excitation light; and controlling a light intensity of the excitation light, based on a result of the monitoring.

13. The optical amplification method according to claim 12, wherein the controlling light intensity of the excitation light includes controlling in such a way that a sum of a light intensity of the excitation light and the light intensity of the residual excitation light becomes constant.

14. The optical amplification method according to claim 9, further comprising monitoring the light intensity of the residual excitation light, wherein the introducing the residual excitation light into the optical amplification medium includes attenuating the light intensity of the residual excitation light, based on a result of the monitoring, in such a way that a sum of a light intensity of the excitation light and the light intensity of the residual excitation light becomes constant.

15. The optical amplification method according to claim 9, wherein
the introducing the residual excitation light into the optical amplification medium includes introducing the residual excitation light into a multimode optical fiber for waveguiding, and restricting a traveling direction of the residual excitation light.

16. The optical amplification method according to claim 9, wherein
the introducing the signal light into the optical amplification medium includes introducing the signal light into a multicore optical fiber including a core doped with a rare earth ion and a double cladding structure, and
the introducing the excitation light into the optical amplification medium includes introducing the excitation light into the optical amplification medium by a cladding excitation method.

* * * * *